United States Patent

Ogasawara et al.

[11] Patent Number: 6,051,807
[45] Date of Patent: Apr. 18, 2000

[54] PULSE ARC WELDING APPARATUS

[75] Inventors: Takaaki Ogasawara; Masaru Tabata; Masahiro Homma; Eiji Sato, all of Toyohashi, Japan

[73] Assignee: Kabushiki Kaisha Kobe Seiko Sho, Kobe, Japan

[21] Appl. No.: 09/046,676

[22] Filed: Mar. 24, 1998

[30]  Foreign Application Priority Data

Apr. 1, 1997 [JP] Japan .................................... 9-083083

[51] Int. Cl.$^7$ ................................................. B23K 9/09
[52] U.S. Cl. ................................ 219/130.51; 219/130.33
[58] Field of Search ........................ 219/130.51, 130.31, 219/130.32, 130.33, 137 PS

[56]  References Cited

U.S. PATENT DOCUMENTS 5,525,778  6/1996  Matsui et al. ....................... 219/130.51
5,824,991  10/1998  Mita et al. .......................... 219/130.51

FOREIGN PATENT DOCUMENTS 5-23850  2/1993  Japan .

*Primary Examiner*—Clifford C. Shaw
*Attorney, Agent, or Firm*—Reed Smith Hazel & Thomas LLP

[57] ABSTRACT

A pulse arc welding apparatus feeds a consumable electrode with a constant rate, and arc-welds by applying a welding current constituted of a pulse current of a constant voltage characteristic and a base current of a constant current characteristic between the consumable electrode and a work piece. A pulse frequency correction circuit outputs a frequency correction value $f_e$ to a pulse frequency control circuit, such that when the pulse current upper limit value or lower limit value is selected continuously in a predetermined number of times at a pulse current comparison and adjustment circuit, pulse frequency is increased/decreased by a predetermined value $\Delta$-f by $\Delta$-f in accordance with the selected number of times. According to the pulse frequency control, the pulse arc welding apparatus is capable of substantially increasing a response of an arc length control, and enabling to follow a change of a welding condition and a fluctuation of the distance between a contact tip and a work piece promptly.

8 Claims, 8 Drawing Sheets

PULSE ARC WELDING APPARATUS

BACKGROUND OF THE INVENTION

1. Field of the Invention

The present invention relates to a pulse arc welding apparatus for arc-welding by feeding a consumable electrode to a workpiece (a part to be welded) with a constant rate, and applying a welding current between the consumable electrode and the workpiece.

2. Description of the Related Art

A pulse arc welding method for welding by feeding a consumable electrode with a constant rate implements a welding by superimposing a pulse current equal to or more than a critical current value which is called a transition current, on a base current of maintaining an arc.

In the pulse arc welding method, such welding cases of combining workpieces of different plate thicknesses and of combining workpieces of different materials are increasing. Also, in the welding apparatus, automation of welding by a robot or an automatic-machine is greatly increasing, and thus is needed a technology of controlling the welding conditions (such as current, voltage, travel speed, etc.), in a preset or in a real-time, in response to a change of a joint of the workpiece, by a combination of vision sensors and the like.

Recently, in a welding procedure of a welding system in which the robot and various sensors are combined, the procedure of welding by changing the welding conditions to equal to or more than that of the conventional welding procedure, according to the changes of plate thicknesses, materials and gaps, in one of successive welding joints, is increasing. Accordingly, it is necessary to stabilize promptly to an arc length which is suited to the conditions when changing the set values of the welding conditions, and in addition, for a wire stick-out length which changes relative to the plate thickness and the joint shape, the necessity of keeping it to a proper arc length is increased. That is, control of the arc length must be fast.

The applicant of the present application has already proposed the technology to greatly increase the arc length control in the pulse arc welding (Japanese Unexamined Patent Publication No. 5-23850). In this prior art, as shown in FIGS. 1 and 3 thereof, in order to ensure a stable weld of one pulse-one droplet transfer, setting an upper limit value and a lower limit value in a pulse current with a constant voltage characteristics are set. When the arc length has been changed suddenly, in the case of an extremely short or long arc length as to reach the upper limit value or the lower limit value, based on a different signal between the set value and the detected value of the pulse current, in addition to a control of increasing/decreasing a pulse frequency f, increasing/decreasing a predefined value Δf in the pulse frequency f, and increasing a variational range of an average current value, greatly control of the arc is greatly increased.

However, in the modern welding procedure, a large fluctuation in the welding condition set value or in the wire stick-out length can not be compensated by only increasing/decreasing the predefined value Δf in the pulse frequency, as described in the above mentioned pre-filed patent application, and it will take too much time until a proper arc length can be achieved. For this reason, in a case where the arc is long, a welding bead will be dented, and a concentration of the arc will vanish, and thus there exist weak points such that the beads are broken off, and the deflection beads occur. Also, in a case where the arc length is short, the welding beads will also be conveyed, and the arc shortage will occur, or the burn-through will occur for thin workpieces. In either case, it has been very difficult to obtain a good welding result.

SUMMARY OF THE INVENTION

Accordingly, it is an object of the present invention to provide a pulse arc welding apparatus capable of substantially increasing a control of an arc length control, and enable one to promptly follow changes in welding conditions and fluctuations in the distance between a contact tip and a workpiece.

The pulse arc welding apparatus according to the present invention comprises, in a pulse arc welding apparatus for arc-welding by feeding a consumable electrode at a constant rate, and by applying a welding current constituting of a pulse current of a constant voltage characteristic and a base current of a constant current characteristic between the consumable electrode and a workpiece:

a pulse voltage detecting means for detecting a pulse voltage;

a pulse voltage setting means for setting a pulse voltage;

a pulse current control means for outputting a pulse current command value, based on a different signal between the pulse voltage detecting means and the pulse voltage, setting means;

a pulse current detecting means for detecting a pulse current;

a pulse current setting means for setting a pulse current;

a pulse frequency control means for outputting a pulse frequency command value, based on a different signal between the pulse current detecting means and the pulse current setting means;

a pulse current upper and lower limit value setting means for outputting a pulse current upper limit value and/or lower limit value;

a pulse current comparison and adjustment means for inputting a pulse current command value and a pulse current upper limit value and/or a pulse current lower limit value, and for outputting the pulse current upper limit value, when the pulse current command value is larger than an upper limit value of a pulse current, and/or the pulse current lower limit value when the pulse current command value is less than a lower limit value of the pulse current, and for outputting the pulse current command value in a case except the above; and a pulse frequency correction means for outputting a frequency correction value $f_e$ to the pulse frequency control means, such that when the pulse current upper limit value or lower limit value is selected continuously in a predetermined number of times at the pulse current comparison and adjustment means, the pulse frequency is increased/decreased by a predetermined value Δf in accordance with the selected number of times.

This pulse arc welding apparatus, may further include:

a pulse frequency reference value setting means for outputting a pulse frequency reference value corresponding to a wire feed rate; and a pulse frequency adding means for adding the pulse frequency reference value and a pulse frequency command value which is an output of the pulse frequency control means, and for outputting a pulse frequency added value f.

Further, the predetermined value Δf is a value which corresponds to an amount of either the pulse frequency reference value or the pulse frequency added value.

Further, the predetermined value Δf is a value which corresponds to the difference between the pulse current command value and the pulse current upper limit value, the pulse current lower limit value, or an output value of the pulse current setting means.

The second pulse arc welding apparatus includes, in an AC pulse arc welding apparatus for feeding a consumable electrode at a constant rate, for arc-welding by applying a welding current constituting of a pulse current of a constant voltage characteristic and a base current of a constant current characteristic and a straight polarity current between the consumable electrode and a workpiece:

a pulse voltage detecting means for detecting a pulse voltage;

a pulse voltage setting means for setting a pulse voltage;

a pulse current control means for outputting a pulse current command value, based on a different signal between the pulse voltage detecting means and the pulse voltage setting means;

a pulse current detecting means for detecting a pulse current and a pulse current setting means for setting a pulse current;

a pulse frequency control means for outputting a pulse frequency command value, based on a different signal between the pulse current detecting means and the pulse current setting means;

a pulse current upper and lower limit value setting means for outputting a pulse current upper limit value and/or lower limit value;

a pulse current comparison and adjustment means for inputting a pulse current command value and a pulse current upper limit value and/or a pulse current lower limit value, and for outputting the pulse current upper limit value, when the pulse current command value is larger than an upper limit value of a pulse current, and/or the pulse current lower limit value when the pulse current command value is less than a lower limit value of the pulse current, and for outputting the pulse current command value in a case except the above; and a pulse frequency correction means for outputting a frequency correction value $f_e$ to the pulse frequency control means, such that when the pulse current upper limit value or lower limit value is selected continuously in a predetermined number of times at the pulse current comparison and adjustment means, the pulse frequency is increased/decreased by a predetermined value Δf in accordance with the selected number of times.

In this pulse arc welding apparatus, may further include:

a pulse frequency reference value setting means for outputting a pulse frequency reference value corresponding to a wire feed rate and a straight polarity ratio; and a pulse frequency adding means for adding the pulse frequency reference value and a pulse frequency command value which is an output of the pulse frequency control means, and for outputting a pulse frequency added value f.

The predetermined value Δf is a value which corresponds to an amount of either the pulse frequency reference value or the pulse frequency added value.

Further, the predetermined value Δf is a value which corresponds to a difference between the pulse current command value and the pulse current upper limit value, the pulse current lower limit value, or an output value of the pulse current setting means.

DESCRIPTION OF THE PREFERRED EMBODIMENTS

Figure 1:
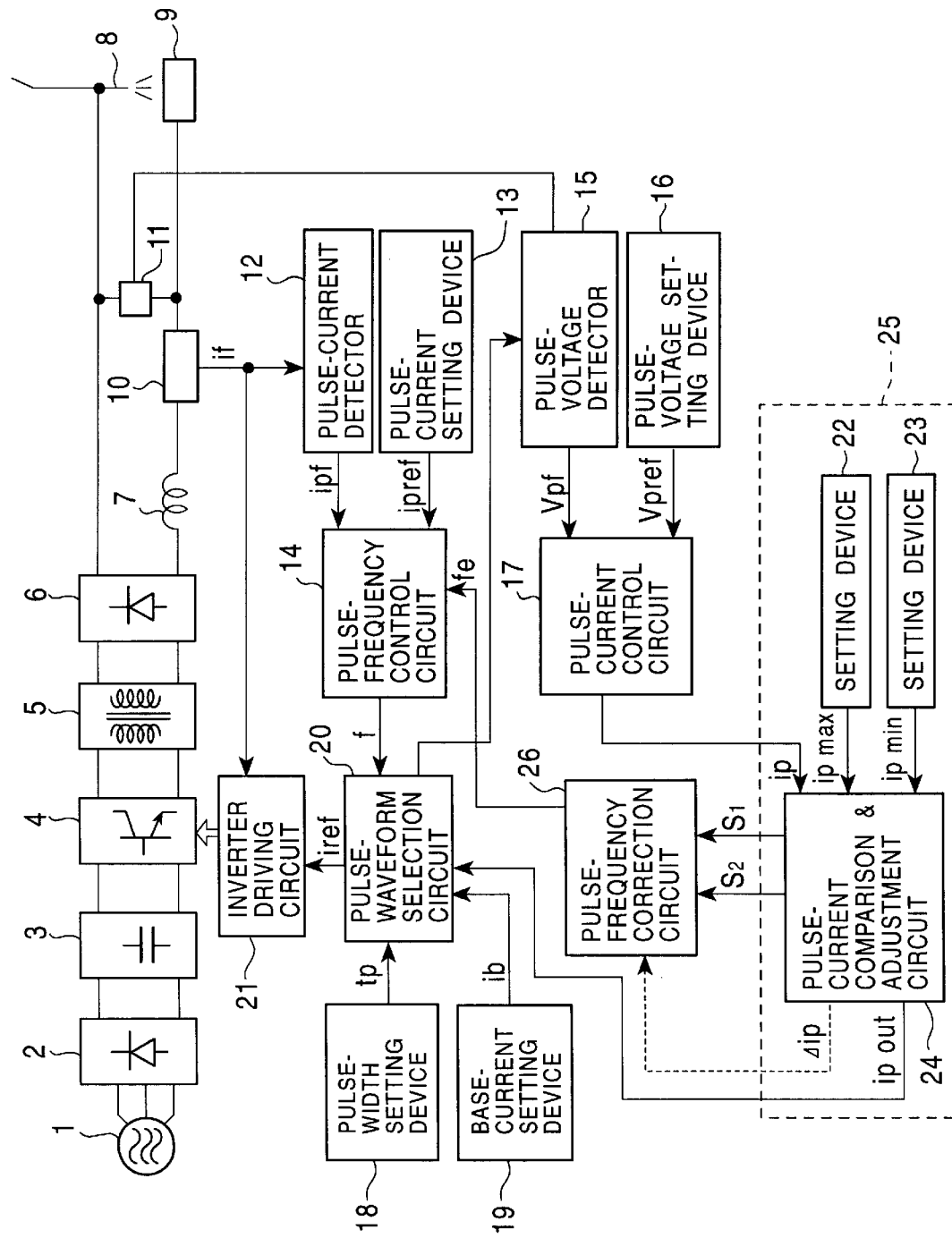
FIG. 1 is a block diagram showing the first embodiment of the pulse arc welding apparatus according to the present invention.

With reference to the accompanying drawings, the preferred embodiments of the pulse arc welding apparatus according to the present invention will be described concretely in detail. FIG. 1 is a block diagram showing an apparatus to be used in the first embodiment of the present invention, a power supply 1, rectifiers 2, 6, a smoothing capacitor 3, an inverter 4, a down transformer 5, and a DC reactor 7 having the similar structures as the ones of the well-known inverter-type welder (welding machine).

A current detector 10 of an output control circuit is connected in series, between the DC reactor 7 and a workpiece 9, as well as a voltage detector 11 connected parallel to the workpiece 9 and a consumable electrode 8.

A current value if detected by the current detector 10 is input to the inverter driving circuit 21, as well as being input to a pulse current detector 12, and a voltage value $v_f$ detected by the voltage detector 11 is input to a pulse voltage detector 15. The pulse current detector 12 obtains an average value during a pulse period by inputting a detected value $i_p$, and outputs this as a pulse current detected value $i_{pf}$ to a pulse frequency control circuit 14. Also, to the pulse frequency control circuit 14, a set value $i_{pref}$ the pulse current from a pulse current setting device 13 is input. The pulse frequency control circuit 14 outputs a pulse frequency command value f to a pulse waveform selection circuit 20, based on a difference between these detected value $i_{pf}$ and set value $i_{pref}$.

On the other hand, the pulse voltage detector 15 inputs a detected value $v_f$ of the voltage detector 11 and then outputs a pulse voltage detected value $v_{pf}$ during a pulse period to a pulse current control circuit 17 according to a signal of the pulse waveform selection circuit 20 which will be described later. The pulse voltage setting device 16 outputs a set value $v_{pref}$ of the pulse voltage. The pulse current control circuit 17 which inputs the pulse voltage detected value $v_{pf}$ and pulse voltage set value $v_{pref}$ obtains a pulse current command value $i_p$ which is an amplified difference signal between the detected value $v_{pf}$ and the set value $v_{pref}$ of this pulse voltage, and outputs this to a pulse current comparison and adjustment circuit 24 of a pulse current clamp circuit 25 which will be described later.

Further, to this pulse waveform selection circuit 20 are input a set value $t_p$ of a pulse width output from the pulse width setting device 18 and a set value $i_b$ of a base current output from the base current setting device 19. Then, the pulse waveform selection circuit 20 selects, based on the set value $t_p$ of the pulse width and the command value f of the pulse frequency, the command value $i_p$ of the pulse current during the pulse period $T_p$ and the set value $i_b$ of the base current during the base period $T_B$, and then outputs the selected value to an inverter driving circuit 21 as a current command value $i_{ref}$. The inverter driving circuit 21 controls the inverter 4 such that the current detected value $i_f$ and the current command value $i_{ref}$ are matched.

Then, the pulse current clamp circuit 25 and the pulse frequency correction circuit 26 are connected between the pulse current control circuit 17 and the pulse waveform selection circuit 20. The pulse current clamp circuit 25 is constituted of a pulse current upper limit value setting device 22 for outputting an upper limit value $i_{pmax}$ of a control pulse current, a pulse current lower limit value setting device 23 for outputting a lower limit value $i_{pmin}$ of the pulse current, and the pulse current comparison and adjustment circuit 24. Herein, it is effective to provide either one of the pulse current upper limit value setting device 22 or the pulse current lower limit value setting device 23.

An output $i_{pout}$ of the pulse current comparison and adjustment circuit 24 is input to the pulse waveform selection circuit 20. Then, an output $f_e$ of the pulse frequency correction circuit 26 is input to the pulse frequency control circuit 14.

In the case where the arc length is elongated and $I_{pmin}$ is selected as the $I_{pout}$, the pulse current comparison and adjustment circuit 24 is synchronized with the pulse current period and outputs a pulse signal $S_1$ of one shot, to the pulse frequency correction circuit 26. Assuming that $i_{pmin}$ is selected continuously as $i_{pout}$, it turns to be the pulse signal $S_1$ which is continuous for each period of the pulse current.

The pulse frequency correction circuit 26 outputs a frequency correction value $f_e$, for the pulse frequency control circuit 14, until the signal $S_1$ vanishes after the third round, in the case where the $i_{pmin}$ is selected at consecutively predetermined times, for instance twice, by counting the pulse signal $S_1$. This value of the frequency correction value $f_e$ should be a value such that the predetermined value $\Delta f$ is subtracted for each pulse period.

Figure 2:
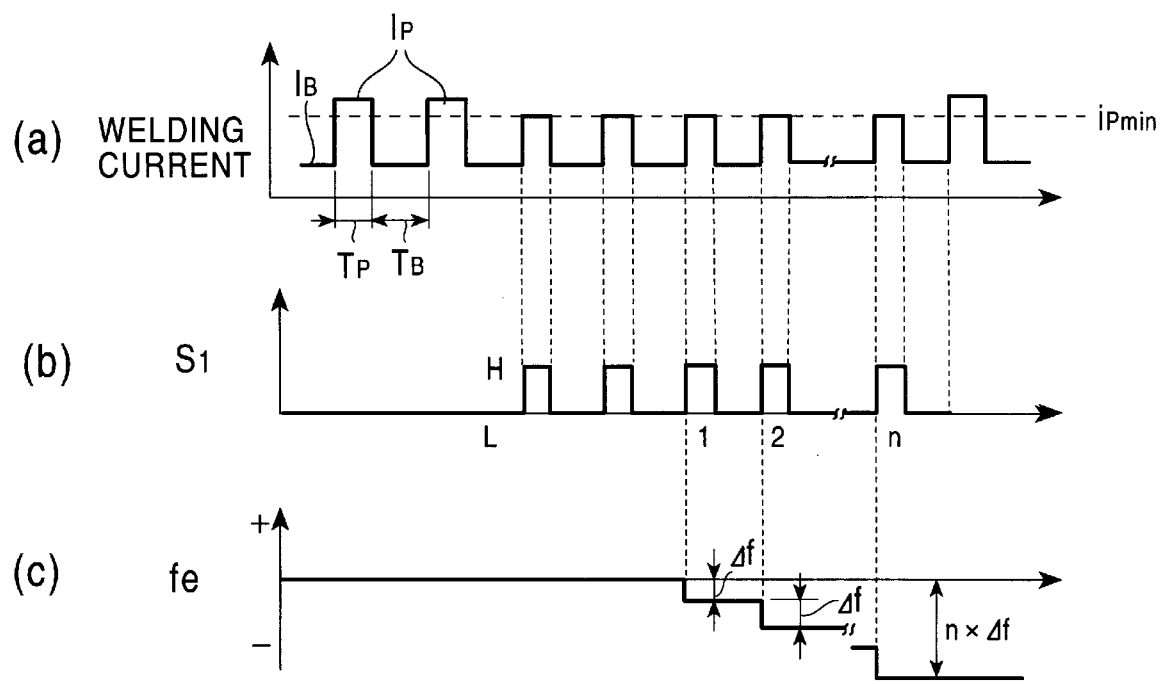
FIG. 2 is a waveform diagram showing the waveforms of the pulse arc welding apparatus of FIG. 1.

In the control apparatus as constituted above, a pulse waveform to be fed to the consumable electrode 8 turns to be as shown in FIG. 2(*a*). In the pulse period $T_p$, a pulse current command value $i_p$ is output to the inverter driving circuit 21 as the $i_{ref}$ by the pulse waveform selection circuit 20. Therefore, the inverter 4 is driven by the pulse current command value $i_p$ such that a predetermined pulse voltage set value $v_{pref}$ and a pulse voltage detected value $v_{pf}$ are matched. Because of this, the pulse voltage $v_p$ turns out to be an external characteristic of a constant voltage characteristic. On the other hand, during the base period $T_B$, a base current set value $i_b$ is provided to the inverter driving circuit 21 by the pulse waveform selection circuit 20. Therefore, the inverter 4 is controlled by a predetermined base current set value $i_b$. For this reason, the base current $I_b$ turns out to be an external characteristic of a constant current characteristic.

Then, in a case that the arc length is shortened, to maintain the pulse voltage $v_p$, the pulse current $I_p$ increases instantaneously, and in a case that the arc length is elongated suddenly, the pulse current $I_p$ decreases instantaneously.

As a compensation for a relatively slow variation of the arc length and a compensation for an adaptivity of a feed rate and a molten rate of the consumable electrode, based on a different signal between the pulse current detected value $i_{pf}$ and a predetermined pulse current set value $i_{pref}$, the pulse frequency f is controlled. For example, in a case that the detected value $i_{pf}$ is larger than the set value $i_{pref}$ when the arc length is too short, by increasing the average current with enlarging the frequency command value f, increasing the molten rate of the consumable electrode and thereby elongating the arc length. Because of this, the detected value $i_{pf}$ decreases. Conversely, in a case that the detected value $i_{pf}$ is smaller than the set value $i_{pref}$ when the arc length is too long, by decreasing the average current by making the frequency command value f smaller, decreasing the molten rate of the consumable electrode and thereby shortening the arc length. , the detected value $i_{pf}$ becomes larger as a result.

Thus, by adjusting the pulse frequency f and then by controlling it in such a manner that the $i_{pf}$ matches with the $i_{pref}$, the pulse current $I_p$ turns to be a roughly constant value.

Because of this, an energy of one pulse-one melting/dropping is secured, thereby implementing a stable transfer of one pulse-one droplet. Also, by changing the average current, a feed rate of the consumable electrode can be matched by controlling the molten rate. Further, turning the pulse current $I_p$ in the pulse voltage $V_p$ to be roughly constant indicates control such that the arc resistance turns out to be a predetermined value, and the arc length becomes to be a constant.

Then, in a case that the arc length is elongated and the $i_{pmin}$ is selected as the command value $i_{pout}$, as shown in FIG. 2, the pulse current comparison and adjustment circuit 24 synchronizes with the pulse current period and outputs the pulse signal $S_1$ of one shot, for the pulse frequency correction circuit 26. If the $i_{pmin}$ is selected continuously as the $i_{pout}$, it turns to be the pulse signal $S_1$ which is continuous for each period of the pulse current. The pulse frequency correction circuit 26 outputs the frequency correction value $f_e$, for the pulse frequency control circuit 14, until the signal $S_1$ vanishes after the third round, in a case that the $i_{pmin}$ is selected continuously for a predetermined times, for instance 2 times, by counting the pulse signal $S_1$. A value of this $f_e$ is taken to be a value from which a predetermined value $\Delta f$ is subtracted for each pulse period.

According to this, comparing with a method of making the pulse frequency small only with a predetermined value $\Delta f$ in a case that the wire stick out length is quickly elongated, and the arc length is extremely elongated, it becomes possible to lower the average current rapidly, in order to further decrease it with an amount of a pulse frequency n×$\Delta f$, where n is a number of times the $i_{pmin}$ being selected when the arc length is still longer thereafter, and thereby it can be quickly returned from a state in which the arc length is long to a proper length.

Figure 3:
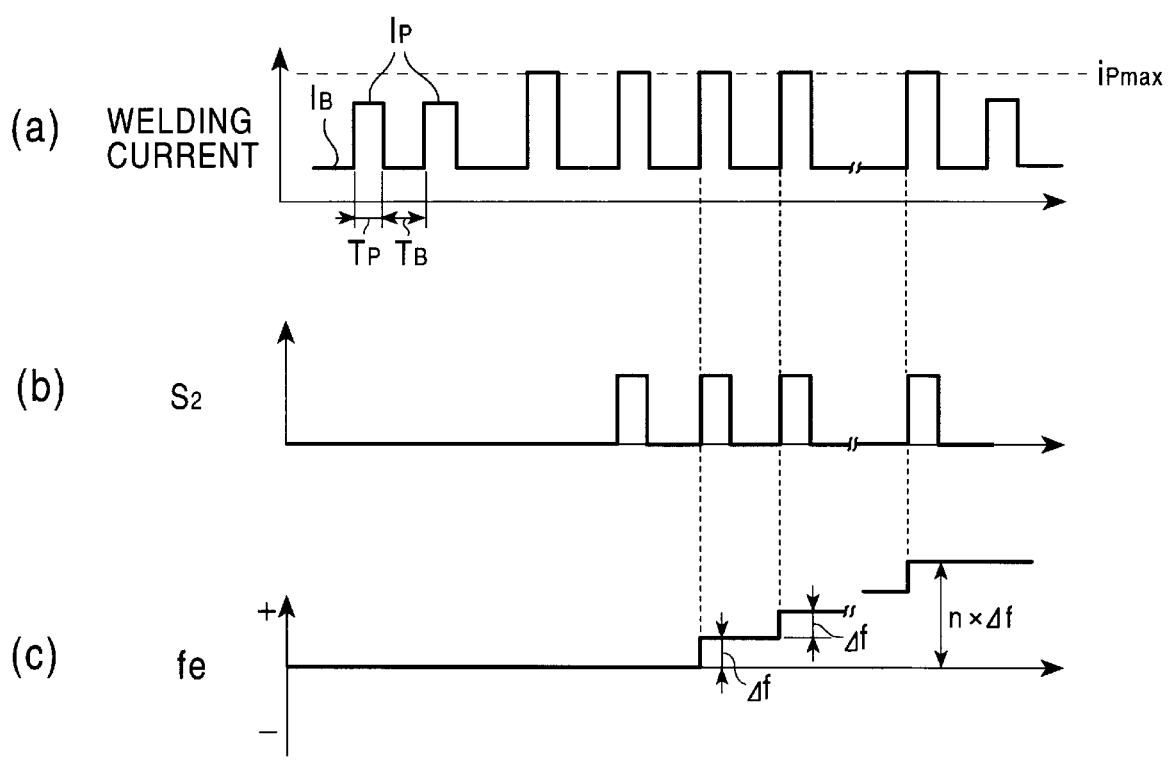
FIG. 3 is a waveform diagram showing other waveforms of the pulse arc welding apparatus of FIG. 1.

The embodiment described above is an operation when the arc length turns to be elongated, but conversely, in a case that the arc length is shortened and the $i_{pmax}$ is selected as the $i_{pout}$, as shown in FIG. 3, the pulse current comparison and adjustment circuit 24 outputs the pulse signal $S_2$ of one shot. The pulse frequency correction circuit 26 outputs the frequency correction value $f_e$ until the signal $S_2$ vanishes after the third round by counting the pulse signal $S_2$, and a value of this $f_e$ is taken to be a value which adds a predetermined value $\Delta f$ for each pulse period. According to this, it becomes possible to raise the average current rapidly, in order to further make it large with an amount of a pulse frequency n×Δf, where n is a number of times the $i_{pmin}$ being selected, when the wire stick-out length is rapidly shortened, thereby it can be quickly returned from a state of which the arc length is short to a proper length.

In the present embodiment, a responsiveness of the arc length is enhanced by lowering the frequency rapidly when the $I_{pmin}$ is selected, and further by raising the frequency rapidly when the $I_{pmax}$ is selected. When the $I_{pmin}$ succeeds and a long state of the arc length continues, because of the vanishing of the arc concentration, deflection in the beads could easily occur as the arc jumps to the thin plate side at which a heat capacity is small and temperature is high at a time of welding a joint of which the plate thicknesses are different.

Also, When the $I_{pmax}$ succeeds and a short state of the arc length continues, according to this high pulse current, a burn-through could occur easily at a thin plate welding. For this reason, in order to prevent the deflection of the beads of the workpiece, of which the heat capacities are different, the effect of reducing control of the frequency at a time of the $I_{pmin}$ selection is remarkable, and for a prevention of burn-through at a time of welding the thin plate, the effect of increasing control of the frequency at a time of selecting the $I_{pmax}$ appears clearly.

As such, although it is a control for either one of these, it could have a sufficient effect depending on a workpiece.

In the case where the arc generation point on the workpiece side is not stabilized (a phenomena of which the arc crawls around because the cathode ray point is not stabilized), an electric resistance of the arc quickly changes and the $I_{pmin}$ or the $I_{pmax}$ is selected. At that time, if the frequency is corrected, it would grow an unstable. When the number of times for $S_1$ or $S_2$ from an occurrence of the signal $S_1$ to an output of the correction value $f_e$ is set to be 3 times as mentioned above, this problem could occur.

In order to prevent this, a correction of the frequency is implemented actually, after having confirmed that the arc length is to be long or to be short, continuously at the predetermined times. It is desirable that these predetermined times could be set at arbitrary numbers of 1 to 10 times mainly according to the materials of the wire and workpiece and the shielding gas.

Figure 4:
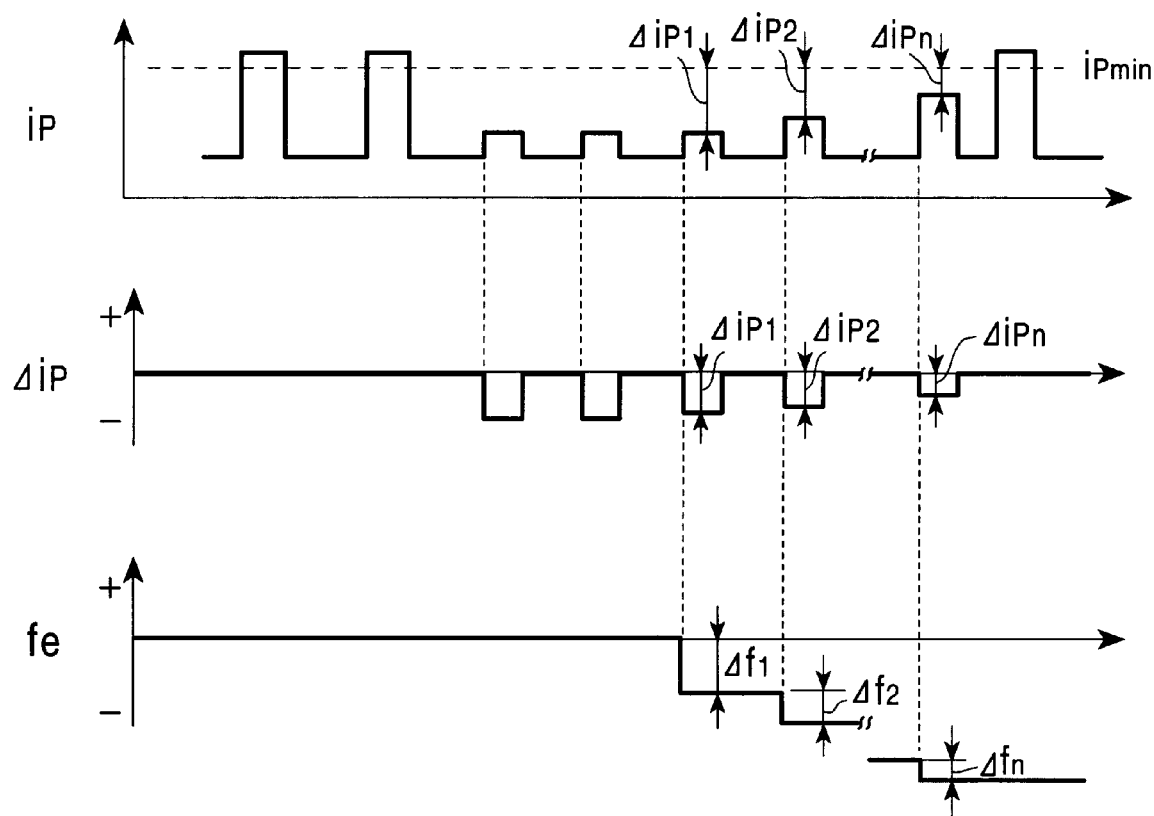
FIG. 4 is a waveform diagram showing a variation of the waveforms of the pulse arc welding apparatus of FIG. 1.

Further, by adding an error amplifier within the pulse current comparison and adjustment device 24, it could add $\Delta i_p$ which is a difference signal between the $i_{pmin}$ or the $i_{pmax}$ and the $i_p$ in addition to the signal $S_1$ of the first embodiment. This difference signal $\Delta i_p$ is shown with a dotted line in FIG. 1. The pulse frequency correction circuit 26 operates $\Delta f_1 \ldots _n$ proportional to these difference signals $\Delta i_{p1} \ldots _n$. For this, a frequency correction value $f_e$ of an output of the pulse frequency correction circuit 26 is the value from which $\Delta f_1 \ldots _n$ proportional to the difference signals $i_{p1} \ldots$ n is subtracted for each pulse period, as shown in FIG. 4.

Since an actual arc length would be shorter as a difference $\Delta i_p$ between the pulse command value and the pulse lower limit value being larger, the frequency correction value $f_e$ would lower the pulse frequency to a great extent by making a predetermined value Δf large in accordance with this difference $\Delta i_p$, thereby improving responsiveness compared with the first embodiment. Further, a similar effect will be obtained by using the pulse current set value $i_{pref}$ instead of the pulse current lower limit value $i_{pmin}$.

Next, the second embodiment of the pulse arc welding apparatus according to the present invention will be described by referring to the block diagram of FIG. 5. In the first embodiment, the pulse frequency f is determined on a basis of the difference between the pulse current detected value $i_{pf}$ and the set value $i_{pref}$. The pulse frequency f is roughly expressed as a function of a feed rate only, if the wire material and wire diameter are determined. In this first embodiment, for outputting the f from the difference between the $i_{pf}$ and the $i_{pref}$ a gain of the pulse frequency control circuit 14 needs to be large, thereby an oscillation at a steady time could occur easily.

Figure 5:
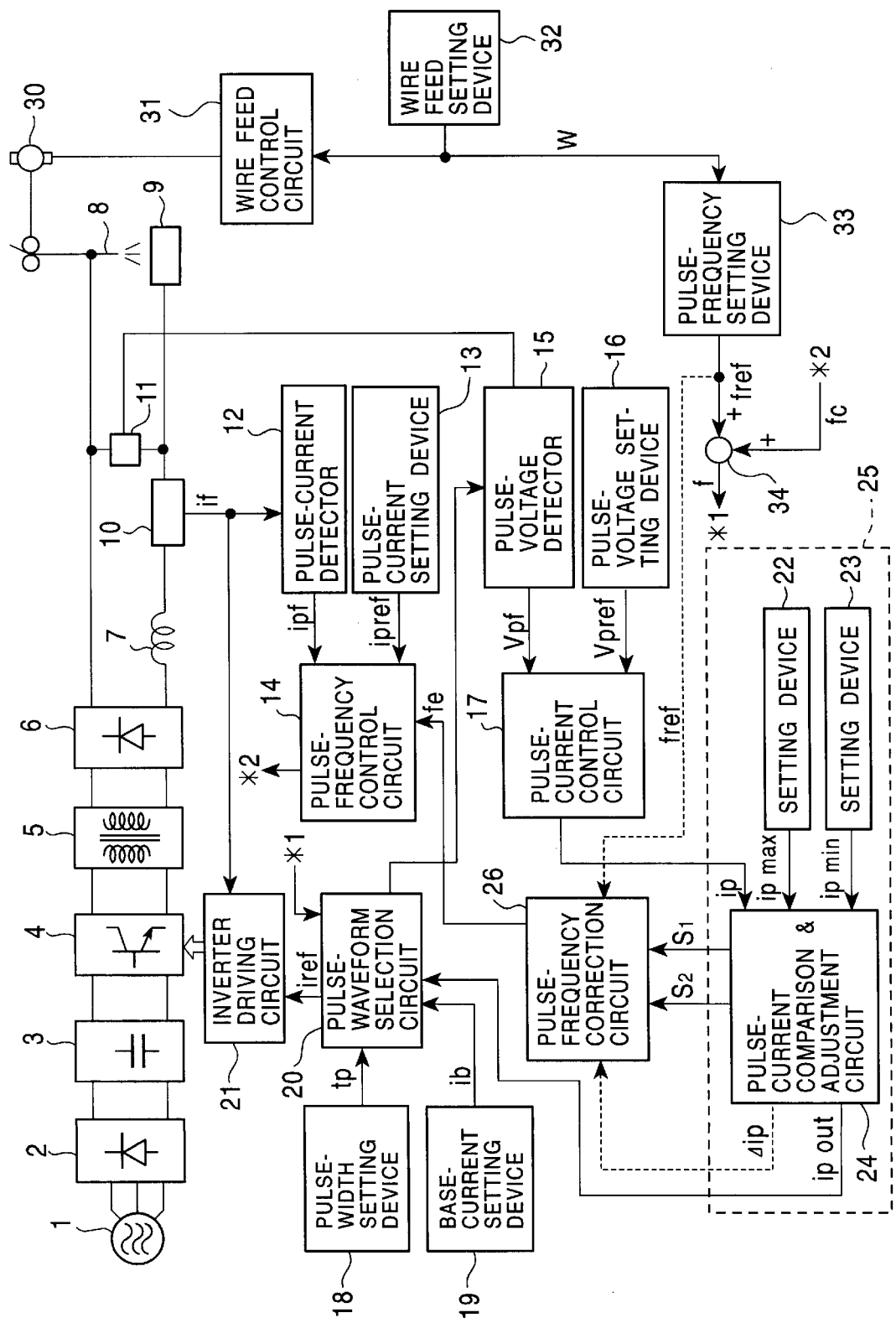
FIG. 5 is a block diagram showing the second embodiment of the pulse arc welding apparatus according to the present invention.

In the second embodiment shown in FIG. 5, a frequency setting device 33 inputs a signal of a wire feed rate setting device 32, and then sets a pulse frequency reference value $f_{ref}$ proportional to the feed rate. An adder 34 adds this $f_{ref}$ and the output $f_c$ of the pulse frequency control circuit 14, and then outputs a pulse frequency f of the welding output to be output actually. This pulse frequency f is input to the pulse waveform selection circuit 20. A set value of the wire feed rate setting device 32 is also input to the wire feed motor control circuit 31, and controls the wire feed motor 30 on the basis of the set value. This wire feed motor 30 feeds the consumable electrode 8.

According to the present embodiment, the $f_c$ only needs to be a deviation between the pulse frequency reference value $f_{ref}$ and a proper pulse frequency f which is slightly different in accordance with a joint shape, a plate thickness, a travel speed, and the like. Thus the gain of the pulse frequency control circuit 14 can be small, thereby preventing an oscillation at the steady time.

Figure 6:
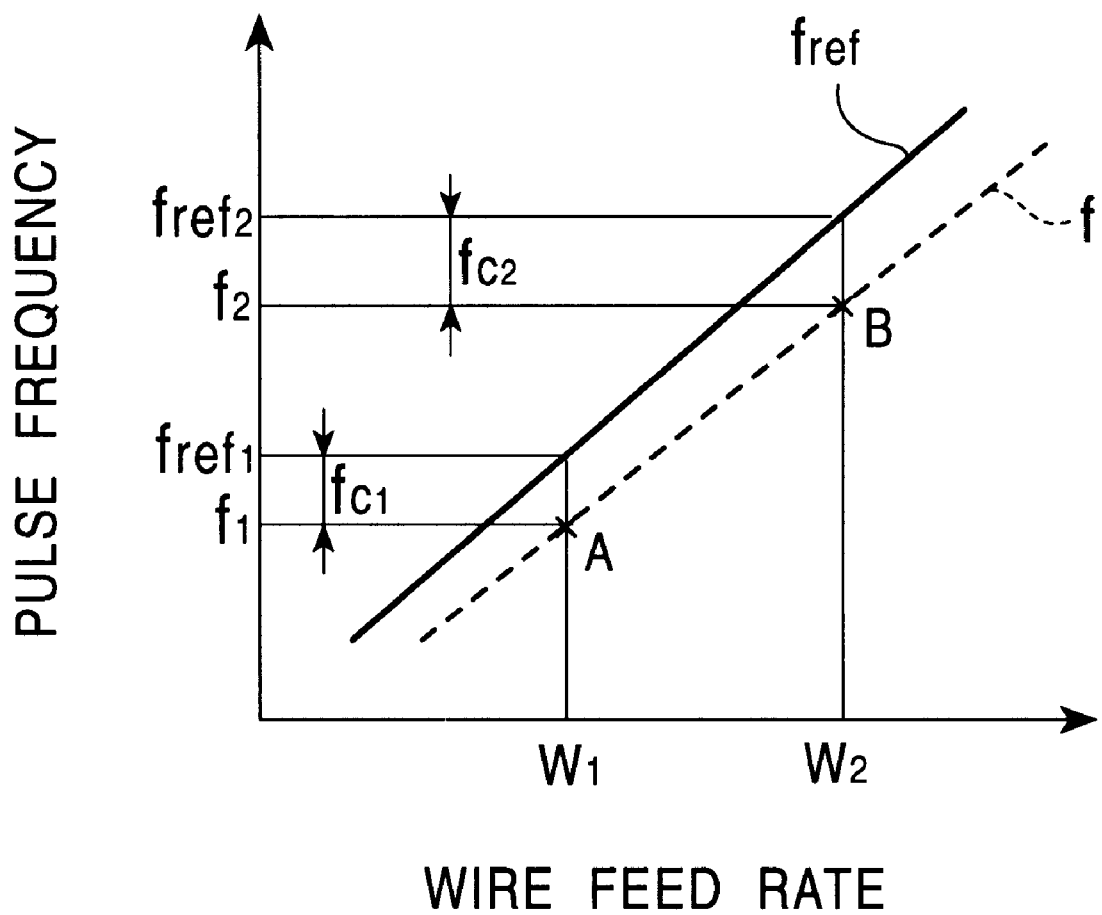
FIG. 6 is a graphic diagram illustrating the operation of the pulse arc welding apparatus of FIG. 5.

Also, as shown in FIG. 6, when the set value of the wire feed rate is changed from $W_1$ to $W_2$ suddenly, in order to cope with a welding joint such that a plate thickness of the workpiece is thickened on the halfway, an operation point would shift from a point A to a point B, if the proper pulse frequencies for each feed rates $W_1$ and $W_2$ are, for example, $f_1$ and $f_2$, respectively.

According to the circuit of the present embodiment shown in FIG. 5, in this process of shifting from the point A to the point B, the pulse frequency reference value $f_{ref}$ is changed from $f_{ref1}$ to $f_{ref2}$ as the set value of the wire feed rate changing from $W_1$ to $W_2$, as well as the output $f_c$ of the pulse frequency control circuit would be quickly controlled from $f_{c1}$ to $f_{c2}$ by the operations of the pulse frequency control circuit 14 and the pulse frequency correction circuit 26, as described in the first embodiment. Therefore, the pulse frequency $f_1$ is quickly changed to the pulse frequency $f_2$ which is suitable for the feed rate $W_2$. As a result, even if the wire feed rate is changed in large, it is instantaneously adjusted to an arc length suitable for each wire feed rate.

Next, an alternative example of the present embodiment will be described. In FIG. 5, as shown in dotted lines, outputting the frequency reference value $f_{ref}$ from the frequency setting device 33 to the pulse frequency correction circuit 26, the predetermined value Δf within this pulse frequency correction circuit 26 is to be set such that when the $f_{ref}$ is large the Δf should be a large value. In this case, when the wire feed rate is large and the $f_{ref}$ is large, then the pulse frequency correction value $f_e$ would be large also, so that responsiveness of the pulse frequency would be improved, compared with a case of the Δf being a constant.

Figure 7:
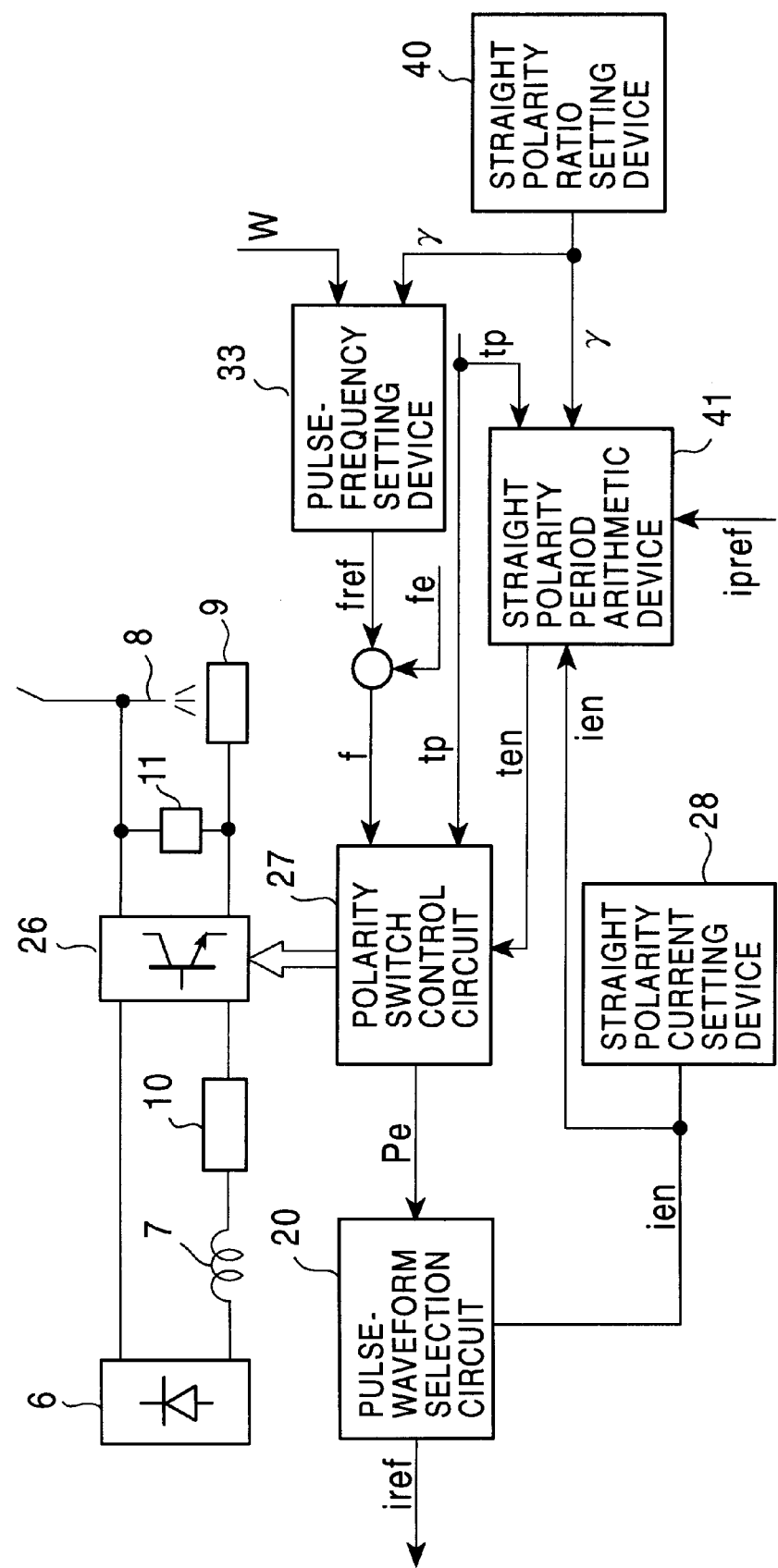
FIG. 7 is a block diagram showing the third embodiment of the pulse arc welding apparatus according to the present invention.

Next, the third embodiment is used in a case where the present invention is applied to a pulse arc welding apparatus of an alternate current. FIG. 7 differs in the points that it is provided with a second inverter 26, a polarity switch control circuit 27, a straight polarity current setting device 28, a polarity ratio setting device 40 and a straight polarity period arithmetic device 41, with respect to FIG. 5 of the second embodiment of the present invention. The second inverter 26 is connected in parallel between the consumable electrode 8 and the workpiece 9. Also, a command value f of a pulse frequency, a set value $t_p$ of a pulse width and a set value $T_{EN}$ of a straight polarity period are input to the polarity switch control circuit 27. This polarity switch control circuit 27 outputs a polarity switch signal $P_e$, such that a predetermined period $T_{EN}$ of a straight polarity is entered into a base period $T_B$, based on this command value f and a pulse width command value $t_p$. At the same time, the polarity switch control circuit 27 drives the second inverter 26, such that an alternate current is applied between the consumable electrode 8 and the workpiece 9.

Further, the pulse current command value $i_{ref}$ which is an output of the pulse waveform selection circuit 20 is input to the inverter driving circuit 21, and is fed to the inverter 4. While the straight polarity current command value $i_{en}$ output from the straight polarity current setting device 28 is input to the pulse waveform selection circuit 20, and the polarity switch signal $P_e$ indicates a straight polarity side, the command value $i_{en}$ is to be selected, as a current designated value $i_{ref}$.

Figure 8:
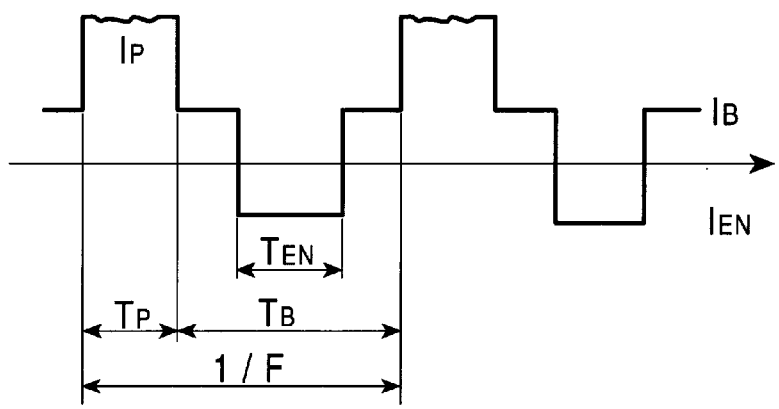
FIG. 8 is a waveform diagram showing the waveforms of the pulse arc welding apparatus of FIG. 7.

According to this configuration, a current waveform to be output turns out to be one as shown in FIG. 8, and external characteristics of a constant voltage characteristic during the $T_p$ period, and a constant current characteristics during the $T_B$ period can be obtained.

The straight polarity period $T_{EN}$ is determined in such a manner that the command value $t_{en}$ during the straight polarity period is so operated as to be $\gamma = i_{en} \times t_{en}/(i_{pref} \times t_p + i_{en} \times t_{en})$, by inputting into the straight polarity period arithmetic device 41, a ratio $\gamma$ set by the straight polarity ratio setting device 40, the command value $t_p$ of the pulse width, the set value $i_{pref}$ of a pulse peak current, and the command value $i_{en}$ of the straight polarity current.

In the present embodiment, in case of increasing/decreasing the average current, in accordance with a difference signal between the detected value and the set value of the pulse current, the arc length is controlled by increasing/decreasing the pulse frequency f (the $T_{EN}$ is fixed, and the $T_B - T_{EN}$ is varied).

Although it is the same as the second embodiment (FIG. 5) such that the frequency command value f is a sum of the pulse frequency reference value $f_{ref}$ and the output $f_c$ of the pulse frequency control circuit 14, a signal of the ratio $\gamma$ is input from the straight polarity ratio setting device 40 to the pulse frequency setting device 33. Since, by setting the ratio of the straight polarity larger, the average current could be small although the wire feed rate is the same, the pulse frequency would be made small. Therefore, the pulse frequency setting device 33 is, in advance, provided with a function of the pulse frequency reference value $f_{ref}$ as indicated by the solid line in FIG. 9 in response to the wire feed rate w and the straight polarity ratio $\gamma$.

Figure 9:
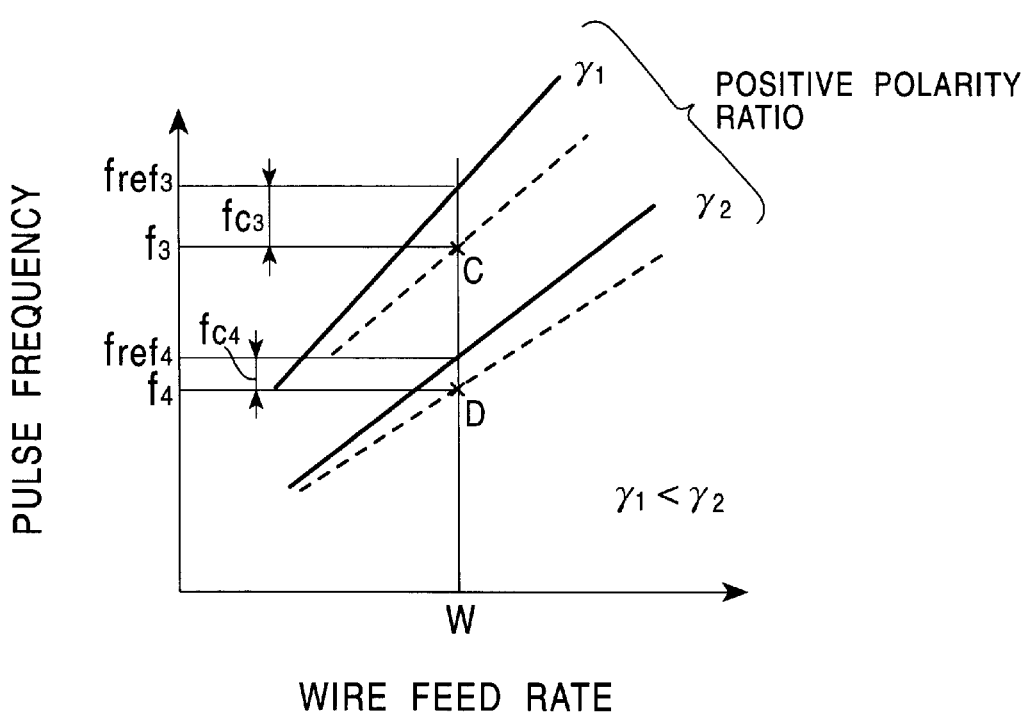
FIG. 9 is a graphic diagram illustrating the operation of the pulse arc welding apparatus of FIG. 7.

In this FIG. 9, the gap of the welding joint turns to be large at the halfway point. Therefore, the operation point will shift from the point C to the point D, if the proper pulse frequencies for each straight polarity ratio $\gamma$ $\gamma_2$ are, for example, $f_3$, $f_4$, respectively in case of setting the straight polarity ratio $\gamma$ larger from the $\gamma_1$ to the $\gamma_2$ of FIG. 9.

According to the present embodiment, in the process of shifting from this point C to the point D, when the setting of the ratio changes from the $\gamma_1$ to the $\gamma_2$, the pulse frequency reference value would be changed from the $f_{ref3}$ to the $f_{ref4}$, as well as the outputs $f_c$ of the pulse frequency control circuit 14 is rapidly controlled from the $f_{c3}$ to the $f_{c4}$ by an operation of the pulse frequency control circuit 14 and the pulse frequency correction circuit 26. As a result of this, the arc length can be adjusted instantaneously so as to be suitable for each polarity ratio, even though the change in the polarity ratio is large.

As described above, according to the present invention, a pulse frequency correction means is provided which outputs the frequency correction value $f_e$ to the pulse frequency control means, such that the pulse frequency is increased/decreased with a predetermined value $\Delta f$ by a predetermined value $\Delta f$ in accordance with a selected number of times when the upper limit value or the lower limit value of the pulse current is selected continuously with a predetermined number of times. Therefore, the responsibility of the arc length control can be substantially enhanced, and the arc length control can quickly follow the change of the welding condition and a fluctuation of the distance between a contact tip and a workpiece.

What is claimed is:

1. A pulse arc welding apparatus for arc-welding by feeding a consumable electrode at a constant rate, and by applying a welding current constituted of a pulse current of a constant voltage characteristic and a base current of a constant current characteristic between the consumable electrode and a work piece, comprising:

a pulse voltage detecting means for detecting a pulse voltage;

a pulse voltage setting means for setting a pulse voltage;

a pulse current control means for outputting a pulse current command value, based on a different signal between said pulse voltage detecting means and said pulse voltage setting means;

a pulse current detecting means for detecting a pulse current;

a pulse current setting means for setting a pulse current;

a pulse frequency control means for outputting a pulse frequency command value, based on a different signal between said pulse current detecting means and said pulse current setting means;

a pulse current upper and lower limit values setting means for outputting at least one of a pulse current upper limit value and a pulse current lower limit value;

a pulse current comparison and adjustment means for inputting a pulse current command value and at least one of a pulse current upper limit value and a pulse current lower limit value, for outputting said pulse current upper limit value when said pulse current upper limit value is input and said pulse current command value is larger than said pulse current upper limit value, and said pulse current lower limit value when said pulse current lower limit value is input and said pulse current command value is less than said pulse current lower limit value, and for outputting said pulse current command value in a case except the above; and a pulse frequency correction means for outputting a frequency correction value $f_e$ to said pulse frequency control means, such that when said pulse current upper limit value or lower limit value is selected continuously a predetermined number of times at said pulse current comparison and adjustment means, said pulse frequency is increased/decreased by a predetermined value $\Delta f$ in accordance with said selected number of times.

2. A pulse arc welding apparatus according to claim 1, further comprising:

a pulse frequency reference value setting means for outputting a pulse frequency reference value corresponding to a wire feed rate; and a pulse frequency adding means for adding said pulse frequency reference value and a pulse frequency command value which is an output of said pulse frequency control means, and for outputting a pulse frequency added value f.

3. A pulse arc welding apparatus according to claim 2, wherein said predetermined value Δf is a value which corresponds to an amount of either one of said pulse frequency reference value or said pulse frequency added value.

4. A pulse arc welding apparatus according to claim 1, wherein said predetermined value Δf is a value which corresponds to a difference between said pulse current command value and said pulse current upper limit value, said pulse current lower limit value, or an output value of said pulse current setting means.

5. An AC pulse arc welding apparatus for feeding a consumable electrode at a constant rate, for arc-welding by applying a welding current constituted of a pulse current of a constant voltage characteristic and a base current of a constant current characteristic and a straight polarity current between the consumable electrode and a work piece, comprising:

a pulse voltage detecting means for detecting a pulse voltage;

a pulse voltage setting means for setting a pulse voltage;

a pulse current control means for outputting a pulse current command value, based on a different signal between said pulse voltage detecting means and said pulse voltage setting means;

a pulse current detecting means for detecting a pulse current;

a pulse current setting means for setting a pulse current;

a pulse frequency control means for outputting a pulse frequency command value, based on a different signal between said pulse current detecting means and said pulse current setting means;

a pulse current upper and lower limit values setting means for outputting at least one of a pulse current upper limit value and a pulse current lower limit value;

a pulse current comparison and adjustment means for inputting a pulse current command value and at least one of a pulse current upper limit value and a pulse current lower limit value, and for outputting said pulse current upper limit value when said pulse current upper limit value is input and said pulse current command value is larger than said pulse current upper limit value, and said pulse current lower limit value when said pulse current lower limit value is input and said pulse current command value is less than said pulse current lower limit value, and for outputting said pulse current command value in a case except the above; and a pulse frequency correction means for outputting a frequency correction value $f_e$ to said pulse frequency control means, such that when said pulse current upper limit value or lower limit value is selected continuously a predetermined number of times at said pulse current comparison and adjustment means, said pulse frequency is increased/decreased by a predetermined value Δf in accordance with said selected number of times.

6. A pulse arc welding apparatus according to claim 5, further comprising:

a pulse frequency reference value setting means for outputting a pulse frequency reference value corresponding to a wire feed rate and a straight polarity ratio; and a pulse frequency adding means for adding said pulse frequency reference value and a pulse frequency command value which is an output of said pulse frequency control means, and for outputting a pulse frequency added value f.

7. A pulse arc welding apparatus according to claim 6, wherein said predetermined value Δf is a value which corresponds to an amount of either one of said pulse frequency reference value or said pulse frequency added value.

8. A pulse arc welding apparatus according to claim 5, wherein said predetermined value Δf is a value which corresponds to a difference between said pulse current command value and said pulse current upper limit value, said pulse current lower limit value, or an output value of said pulse current setting means.

* * * * *